United States Patent [19]
Tanaka et al.

[11] Patent Number: 6,062,195
[45] Date of Patent: May 16, 2000

[54] COMBUSTION CHAMBER FOR DIRECT INJECTED ENGINE

[75] Inventors: Daijiro Tanaka; Uichitake Uchiyama; Shinichi Kurosawa, all of Iwata, Japan

[73] Assignee: Yamaha Hatsudoki Kabushiki Kaisha, Iwata, Japan

[21] Appl. No.: 09/307,084

[22] Filed: May 7, 1999

[30] Foreign Application Priority Data

May 13, 1998 [JP] Japan .................................. 10-148365

[51] Int. Cl.⁷ .................................................. F02B 15/00
[52] U.S. Cl. ............................................................. 123/305
[58] Field of Search .................................. 123/295, 298, 123/301, 302, 305, 308

[56] References Cited

U.S. PATENT DOCUMENTS

| | | | |
|---|---|---|---|
| 5,115,776 | 5/1992 | Ohno et al. | 123/302 |
| 5,259,348 | 11/1993 | Kobayashi et al. | 123/305 |
| 5,806,482 | 9/1998 | Igarashi et al. | 123/305 |
| 5,865,153 | 2/1999 | Matsumoto | 123/305 |
| 5,915,353 | 6/1999 | Matsumura | 123/298 |
| 5,943,993 | 8/1999 | Carensen et al. | 123/298 |

*Primary Examiner*—Erick R. Solis
*Attorney, Agent, or Firm*—Knobbe, Martens, Olson & Bear LLP

[57] ABSTRACT

A combustion chamber and injection strategy for a direct injected internal combustion engine. The combustion chamber is formed with a relatively flat surface across substantially the entire head of the piston to provide a large surface area on which fuel can collect and evaporate. Fuel is injected earlier under lower speed and midrange running than with prior art type of constructions so that the fuel will be longer in the cylinder and have a better chance to vaporize. However, the spray orientation, pattern and timing is such that even though fuel is injected before the exhaust valves are closed at the higher speeds and loads, the fuel will not pass out of the exhaust system.

14 Claims, 7 Drawing Sheets

COMBUSTION CHAMBER FOR DIRECT INJECTED ENGINE

BACKGROUND OF THE INVENTION

This invention relates to a combustion chamber for a direct injected engine and more particularly to an improved combustion chamber configuration and method of operating a direct injected engine.

In the interest of providing further enhancements for the performance and emission control and fuel economy of engines, direct cylinder injection is being applied. One of the advantages of direct cylinder injection is that it permits the charge in the combustion chamber to be stratified. If stratification can be achieved, then the engine need not be filled with a homogeneous mixture under lighter load and running conditions. This will reduce the amount of unburned hydrocarbons in the exhaust gases as well as the fuel economy.

However, it is quite difficult to obtain effective stratification in open chamber engines. This is particularly true since the injected fuel tends to have somewhat larger particles and these larger diameter particles take time to evaporate before the fuel is in a condition where it can be effectively burned. This is particularly true under low speed conditions when only a small amount of fuel is injected.

There have been proposed types of combustion chambers where the piston is provided with a bowl in its head and this bowl is offset toward one side of the combustion chamber, generally the intake side, so as to permit a central spark plug position and to encourage the flow of fuel from the bowl into the area where the spark gap exists.

Figure 1:
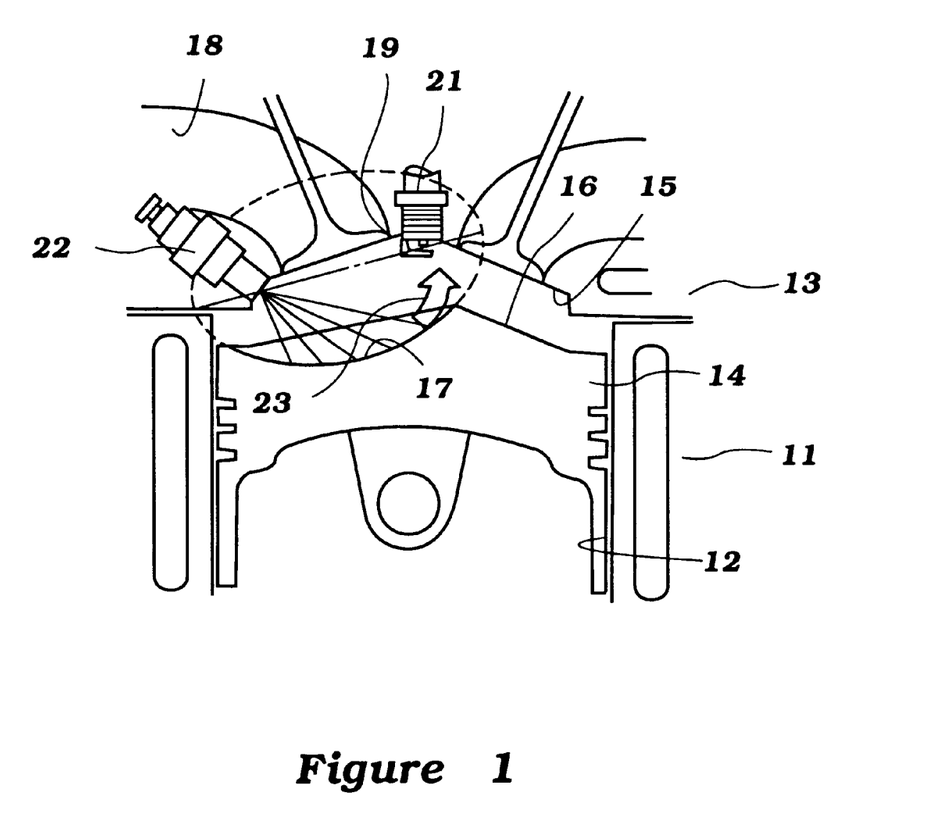
FIG. 1 is a partially schematic cross-sectional view taken through a single cylinder of a prior art type of combustion chamber.

FIG. 1 is a view of a type of prior art construction that is designed to utilize this principle. As seen in this figure, the engine includes a cylinder block 11 in which a cylinder bore 12 is formed. A cylinder head 13 is affixed to the cylinder block and closes the upper end of the cylinder bore 12. A piston 14 reciprocates in the cylinder bore 12 and defames with it and with a recess 15 in the lower surface of the cylinder head 13 a combustion chamber.

The piston 14 is formed with a domed head having a raised portion 16. An offset recess or bowl 17 is formed in one side of the piston 14 and this is the side where the intake passage or passages 18 enter the combustion chamber through valve seats 19.

A spark plug 21 is positioned centrally in the cylinder bore 12 and at the peripheral edge of the bowl 17.

A fuel injector 22 is mounted in the cylinder head 13 and is designed so as to spray in a pattern as shown over a relatively wide arc and toward the base of the bowl 17. Theoretically this causes the fuel to deposit and move as shown by the white arrow in this figure toward the gap of the spark plug 21 so as to ensure the presence of a stoichiometric mixture even under light loads at the time the spark plug 21 is fired.

To obtain the effects desired, it is relatively necessary to inject the fuel substantially late in the cycle and when the piston is approaching its top dead center position before the spark plug 21 is fired. This means that the fuel that is injected does not remain in the cylinder for a very long period of time before the spark plug 21 fires. Thus, there may be substantial unvaporized fuel which will still result in some hydrocarbon emissions.

It is, therefore, a principal object of this invention to provide an improved combustion chamber configuration and operational method wherein the fuel can be injected earlier into the cycle and still will remain in a stratified condition.

It is a further object of this invention to provide an improved combustion chamber configuration and injection pattern that permits the fuel to more fully vaporize before the spark plug is fired, even under low speed/low load conditions.

Of course, the maximum time that the fuel can be maintained in the combustion chamber is somewhat limited by the time that the exhaust valve is opened. If fuel is injected at a time when the exhaust valves are open, then some of this fuel may pass out of the combustion chamber with exhaust gases. This is obviously undesirable.

It is, therefore, a still further object of this invention to provide an improved combustion chamber configuration and injection strategy wherein the fuel can be injected at a time when the exhaust valve is open without escaping from the exhaust port.

By injecting fuel earlier in the cycle, greater time for vaporization will also occur. Also, it is desirable if some of the fuel can be moved into proximity with the exhaust valve or valves at a time when they are closed or substantially closed so that the heat of the valve can help in fuel vaporization.

It is, therefore, a still further object of this invention to provide an improved combustion chamber configuration and injection strategy wherein the heat of the exhaust valves can be utilized to assist in fuel vaporization without risk of the fuel passing out of the exhaust port.

SUMMARY OF THE INVENTION

This invention is adapted to be embodied in an internal combustion engine combustion chamber formed by a cylinder block, cylinder head assembly defining a cylinder bore closed at one end by the cylinder head portion thereof. A piston reciprocates in the cylinder bore for forming a combustion chamber. The piston has a head portion facing a pair of exhaust ports lying on substantially one side of a plane containing the axis of the cylinder bore and a pair of intake ports lying on the other side of the plane. Exhaust and intake valves control the opening of the exhaust and intake ports, respectively. A fuel injector is mounted in said cylinder block, cylinder head assembly at the upper end of one side of the combustion chamber in a position generally between the intake ports. The fuel injector has a spray axis directed generally transversely across the cylinder bore and downwardly toward the head of the piston. The piston head is formed with a generally flat upper surface thereof which extends generally in the area facing both the intake ports and the exhaust ports. A spark plug is mounted in the cylinder block, cylinder head assembly with its spark gap positioned substantially on the cylinder bore axis and surrounded by said intake and exhaust ports. A control for controls the injection of fuel from the fuel injector into the combustion chamber. The injection control is interrelated to the operation of the exhaust valves and the intake valves so that under at least some engine running conditions fuel is injected by the fuel injector into the combustion chamber when said piston is in a position contiguous to its upper dead center position during the exhaust stroke of the engine and when the exhaust valves are at least partially open. The injected fuel is directed towards the piston head. The injection occurs at least in part at a time when the intake valves are open so that the flow from the intake valves will direct fuel away from the heads of the exhaust valves and back toward the piston head for precluding the escape of fuel from the exhaust ports and for effecting the deposit of fuel on the piston head to form a patch of fuel in the vicinity of the spark plug at the time of firing of the spark plug.

DETAILED DESCRIPTION OF THE PREFERRED EMBODIMENT OF THE INVENTION

Before describing in detail the portion of the engine which embodies the invention, it should be understood that the invention deals primarily with the configuration of the combustion chamber and the injection timing strategy. Therefore, only the portion of the engine which forms the combustion chamber is illustrated in the drawings and it is shown in conjunction with only a single cylinder of the engine, identified generally by the reference numeral 31. Where any details of the construction of the engine 31 are not illustrated or described, those skilled in the art can readily practice the invention by resort to known technologies for those components and their interaction with the remaining components of the engine 31.

The engine 31 includes a cylinder block 32 having one or more cylinder bores 33 laid out in any desired pattern. A cylinder head 34 is affixed in a known manner to the cylinder block 32. The surface of the cylinder head 34 that mates with the upper surface of the cylinder block 32 is formed with a recess which cooperates with the cylinder bore 32 and the head of a piston 35 which reciprocates in the cylinder bore 33 to form a combustion chamber, indicated generally by the reference numeral 36.

As will become apparent as this description proceeds, the head of the piston 35 is formed with a shallow, generally spherical shaped depression that is coated with a ceramic-like material 37 to provide insulation of the remainder of the head from the heat of the combustion chamber and also so as to maintain a more elevated temperature in this area but limited to the ceramic material 37. The resulting piston upper surface is, therefore, substantially flat.

The cylinder head 34 is formed on one side thereof with a pair of intake passages 38 that extend from inlet openings in an outer surface 39 of the cylinder head to intake valve seats or ports 41. These intake valve seats or ports 41 are formed in a suitable manner and are valved by poppet-type intake valves 42.

These intake valves 42 have stem portions that are slidably supported in guides 43 that are fixed to and form a part of the cylinder head 34. Coil compression springs 44 engage the cylinder head 34 and a keeper retainer assembly 45 fixed to the valve stem for urging the intake valves 42 to their closed positions.

Any type of induction system, shown partially and indicated by the reference numeral 46, supplies an intake charge to the cylinder head intake passages 38. This induction system may include throttle valves and flow controlling valves that are designed to engender either swirl, tumble, or a combination thereof to the intake charge during all or portions of the induction cycle and under all or only certain running conditions.

Figure 8:
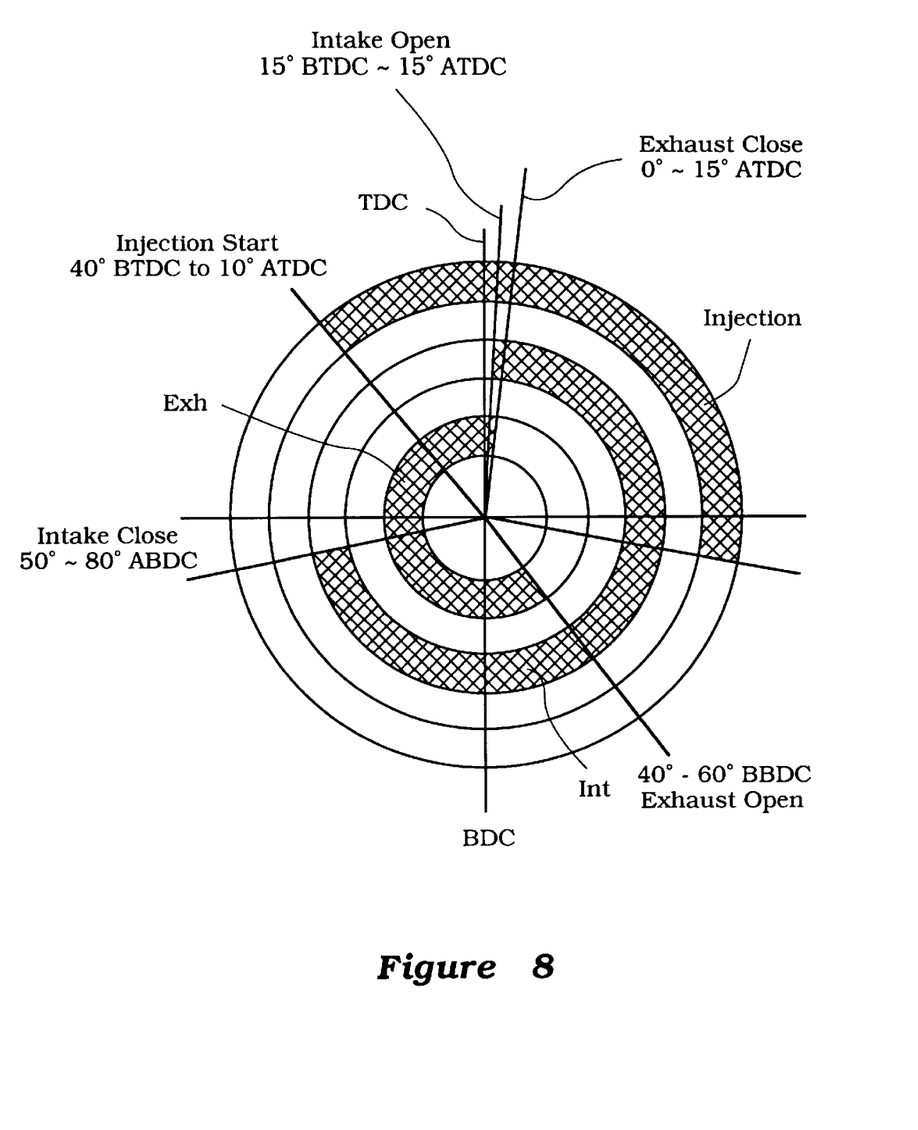
FIG. 8 is a timing diagram showing the valve timing events and injection timing in accordance with the invention.

An intake cam shaft 47 is rotatably journaled within the cylinder head 34 in a suitable manner by means that include bearing caps 48. This intake cam shaft 47 is driven at one-half crankshaft speed by a suitable timing drive. The intake cam shaft 47 has individual lobes 49 that cooperate with thimble tappets 51 so as to open the intake valves 42 in accordance with any desired timing strategy. One such intake timing strategy will be described later by reference to FIG. 8.

Figure 2:
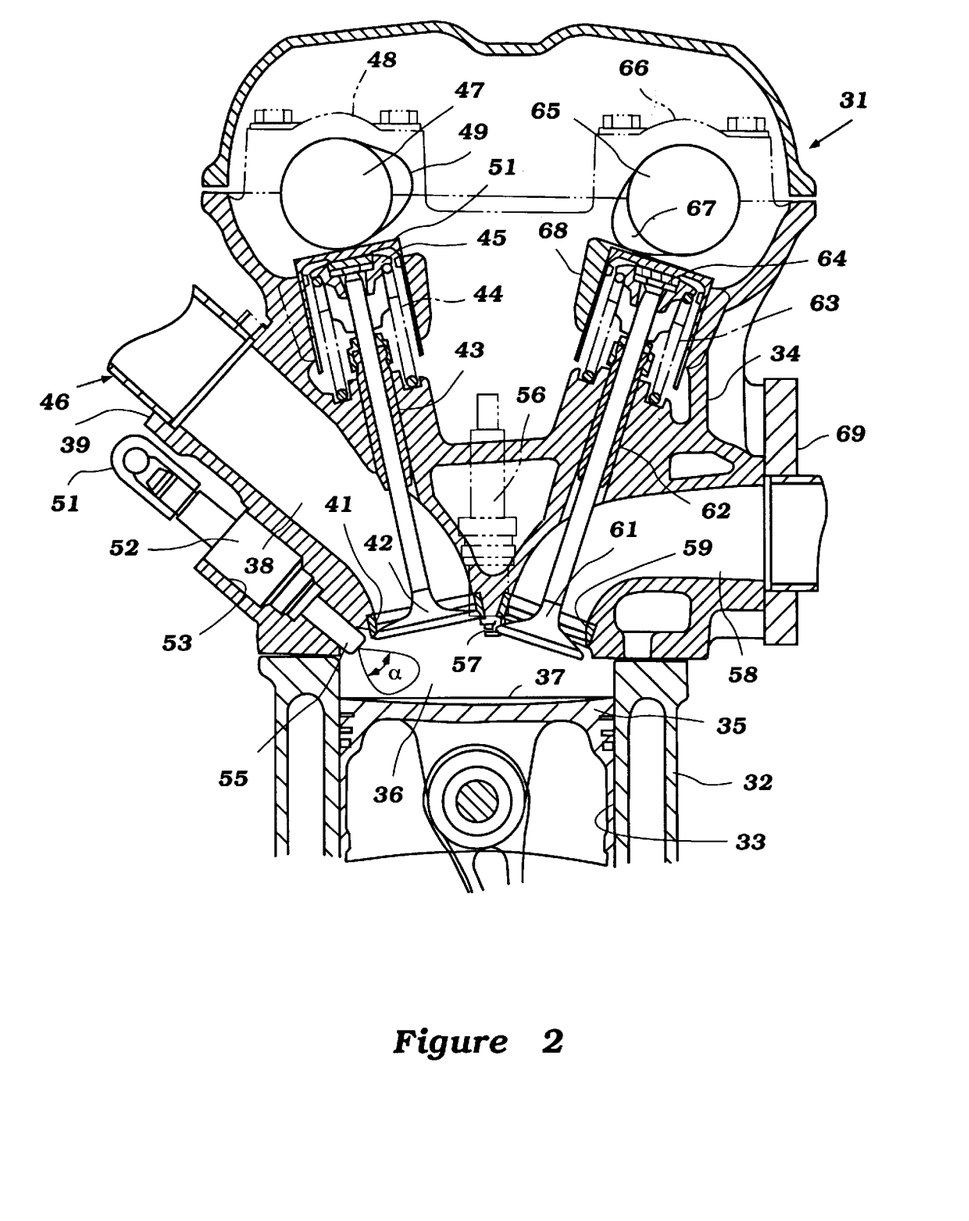
FIG. 2 is a cross-sectional view, in part similar to FIG. 1, but shows an engine constructed in accordance with an embodiment of the invention with the piston moving toward top dead center toward the end of the exhaust stroke and showing the early stage of fuel injection.
Figure 3:
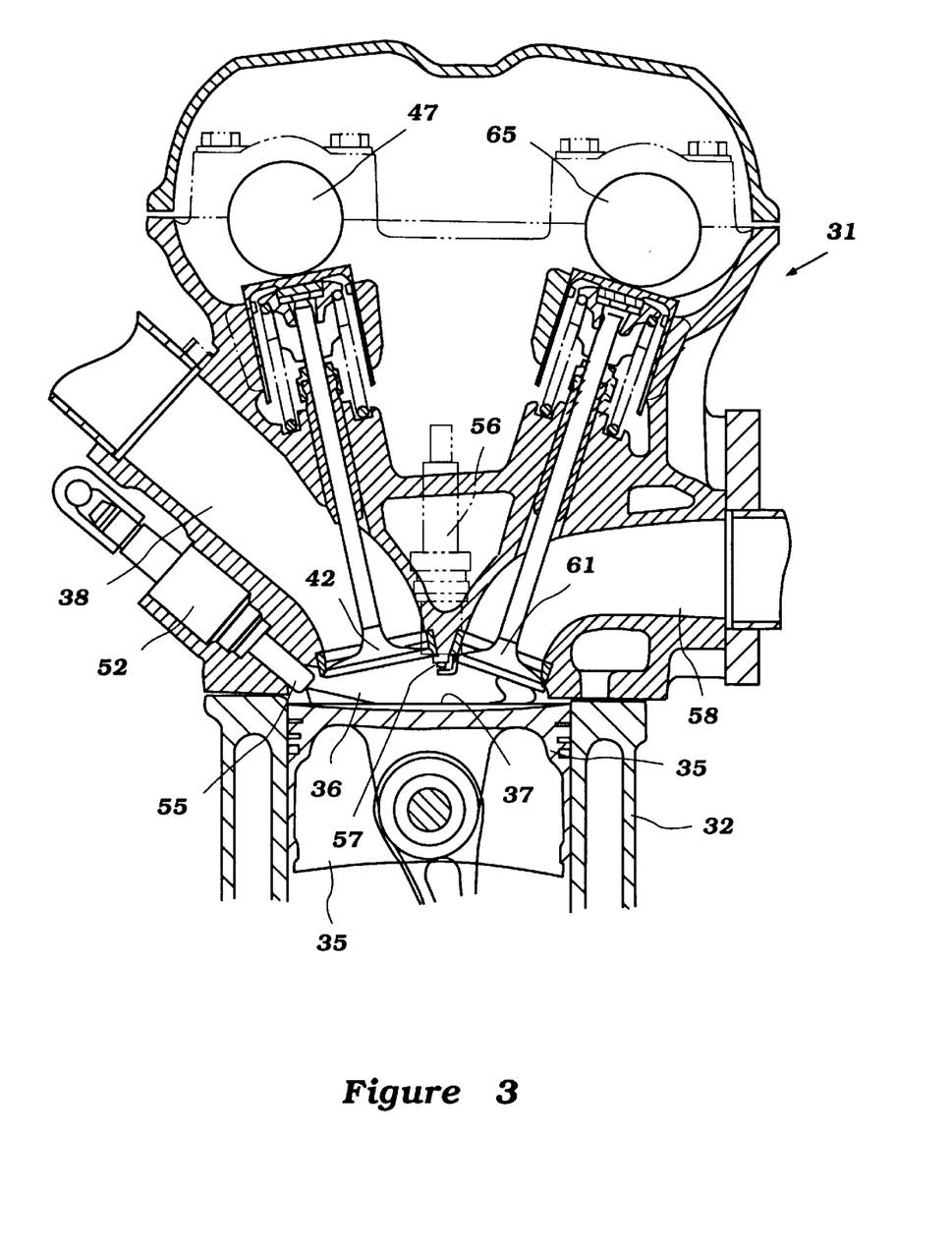
FIG. 3 is a cross-sectional view, in part similar to FIG. 2, and shows the condition when the piston has reached top dead center and is beginning at down stroke for the induction phase and while fuel is still being injected.
Figure 4:
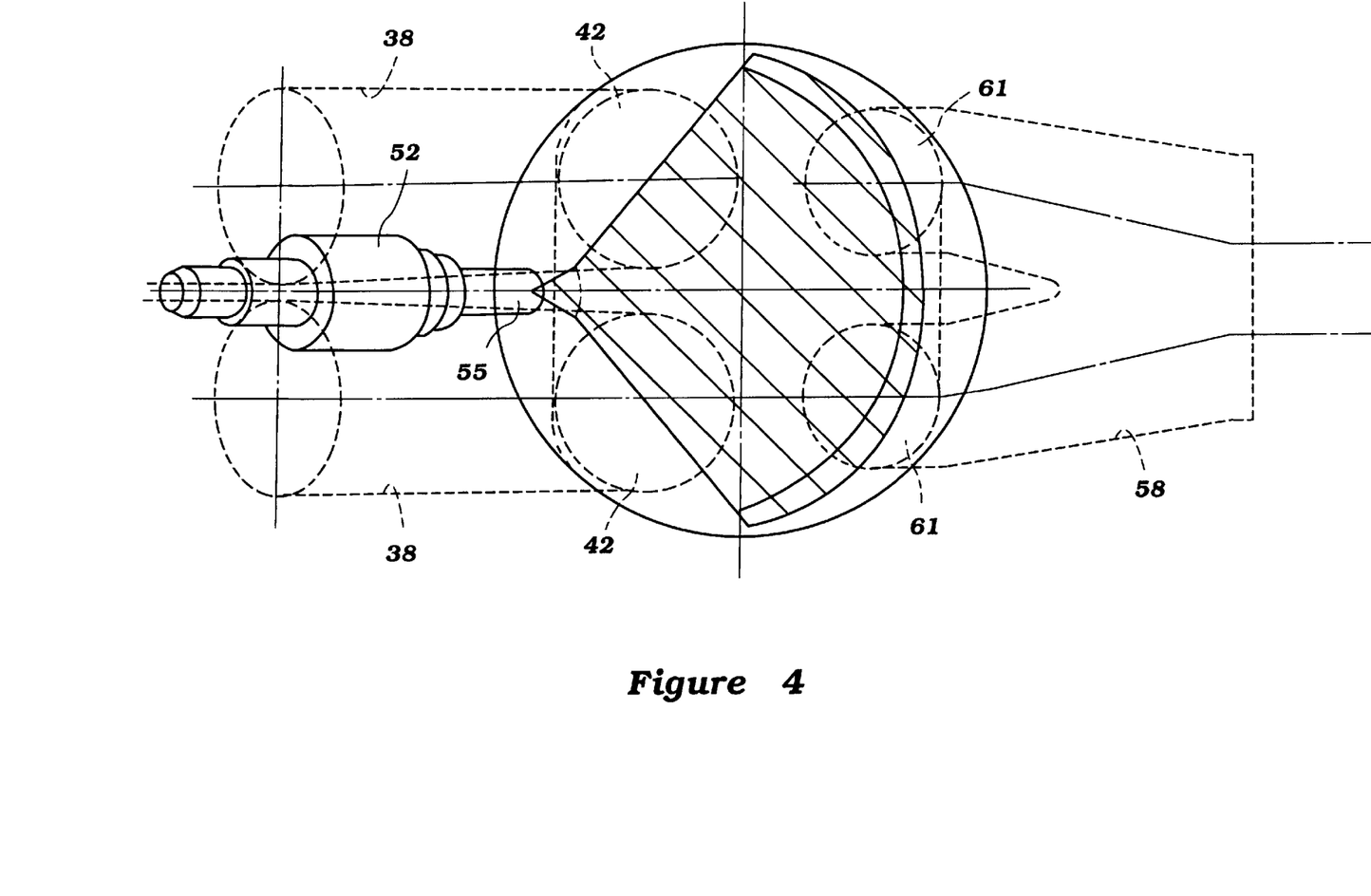
FIG. 4 is a top plan view of the cylinder head showing the combustion chamber and fuel injector in solid lines and intake in exhaust passages in phantom lines so as to show the full details of the spray pattern from the fuel injector.

A fuel injector 52 is mounted in an injector receiving opening 53 formed in the cylinder head 34 adjacent, below, and between the intake passages 38 as best seen in FIGS. 2–4.

It should be noted that the intake passages 38 have generally straight portions which curve slightly toward the valve seats 41. The injector receiving recesses 53 and injector 52 are disposed substantially parallel to the straight portions of the intake passages 38. The injectors 52 receive fuel from a suitable fuel supply system including a fuel rail 54.

The injectors 52 have nozzle tips 55 which contain controlling injection valves that are operated in any known manner, as by a solenoid actuator. The injector nozzles 56 are of the swirl type and inject fuel in a generally conical pattern at a spray angle $\alpha$ downwardly toward the piston head 35 and specifically the ceramic coating 37. Preferably, the cone angle is in the range of 45–70°. Fuel is injected in a timing strategy as will be described.

The fuel which is injected by the injectors 52 will mix with the air and vaporize so as to provide a stoichiometric mixture for firing by a spark plug 56. The spark plug 56 is mounted in the cylinder head 34 so that its spark gap 57 is disposed substantially on the axis of the cylinder bore 33.

The charge is ignited by the spark plug 56 and burns will expand to drive the piston 35 downwardly. Exhaust gases are dispelled from the combustion chambers 36 through a Siamese-type exhaust passage 58 formed in the cylinder head on the opposite side from the intake passages 38. This exhaust passage 58 extends from a pair of exhaust valve seats 59 which lie on the other side of the aforenoted plane containing the cylinder bore axis from the intake valve seats 41.

Poppet-type exhaust valves 61 are slidably supported in valve guides 62 that are fixed to and form a part of the cylinder head assembly 34. Coil compression springs 63 act against keeper retainer assemblies 64 on the upper ends of the stems of the exhaust valves 62 to hold them in a closed position.

The exhaust valves 61 are open by an exhaust cam shaft 65 which, like the intake cam shaft 47 is journaled in the cylinder head 34 in a known manner including via bearing cap 66. Like the intake cam shaft 47, the exhaust cam shaft 65 is driven at one-half crankshaft speed by a suitable timing mechanism. The exhaust cam shaft 65 has lobes 67 that cooperate with thimble tappets 68 for opening the exhaust valve 61 in a known manner.

An exhaust manifold 69 is affixed to the side of the cylinder head opposite the intake manifold 46 and collects the exhaust gases from the exhaust passages 38 and discharges them into the atmosphere.

As should be coming apparent from the description, the invention in this case deals primarily with not only the combustion chamber configuration but also in connection with the injection timing so as to achieve the desired result. This will now be described by primary reference to FIGS. 2, 3 and 5–7 which show various stages in the cycle and FIG. 8 which is a timing diagram showing the opening and closing of the intake and exhaust valves and the injection timing. Later, by reference to FIG. 9, there will be a comparison between this methodology and the prior art to show how the performance is improved.

Basically, the concept is to inject fuel early in the cycle and permit the fuel to vaporize because of a longer presence in the combustion chamber before the spark plug 56 is fired. This is done, however, in a way so that the fuel will not pass out of the exhaust port 59 even though injection begins while the exhaust valves 61 are still open.

Figure 5:
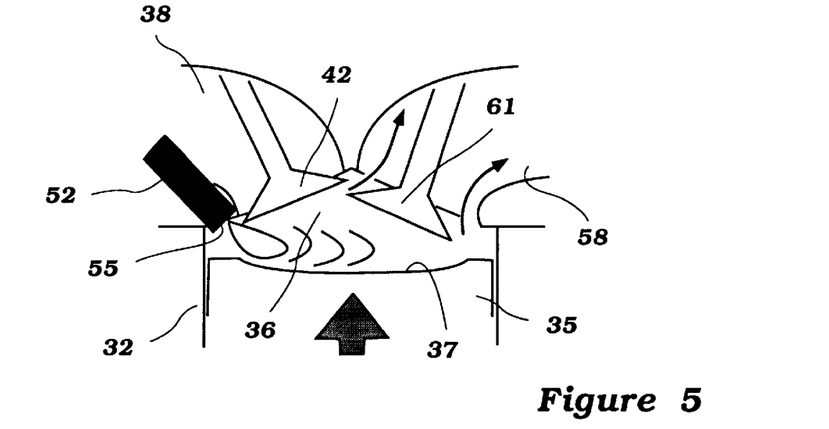
FIG. 5 is a partially schematic view showing the condition of the fuel in the piston position shown in FIG. 2.

FIGS. 2 and 5 shows a condition when the piston 35 is moving upwardly at the end of the exhaust stroke. As may be seen, as the piston 35 approaches top dead center position and at some time period which may be as much as 40° before top dead center (TDC) on the exhaust stroke, the injection is begun. As will be seen, this is a time when the exhaust valves 61 are still open but are beginning to close. The exhaust valve timing is such that the exhaust valves 61 open at 40° to 60° before bottom dead center on the power stroke.

Because the fuel injectors 52 inject downwardly toward the ceramic portion 37 on the head of the piston 35, the fuel will tend to be deposited on the upper surface and move gradually toward the exhaust side of the combustion chamber as seen in FIG. 5. Thus, even though the exhaust valves are still open the fuel will not have migrated to a position where it will be mixed with to any significant degree with exhaust gases and hence will remain in the combustion chamber 36.

After the piston reaches top dead center position, the exhaust valve will close sometime within top dead center to 15° after TDC, depending upon the particular configuration of the engine and whether or not variable valve timing is employed. As the piston 35 continues its downward movement, now on the intake stroke, the intake valves 42 will open. This occurs in the range of 15° before TDC to 15° after TDC, again depending on specific design and running condition, if variable valve timing is employed.

Figure 6:
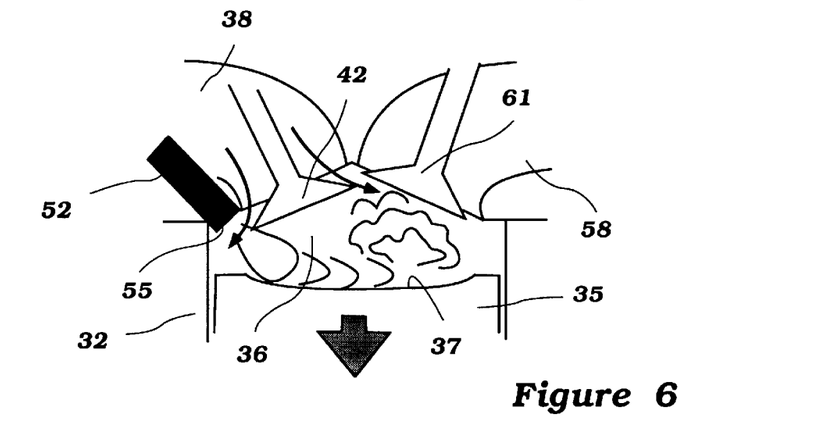
FIG. 6 is a view, in part similar to FIG. 5 and also to FIG. 3 but showing a point later in the intake cycle.
Figure 7:
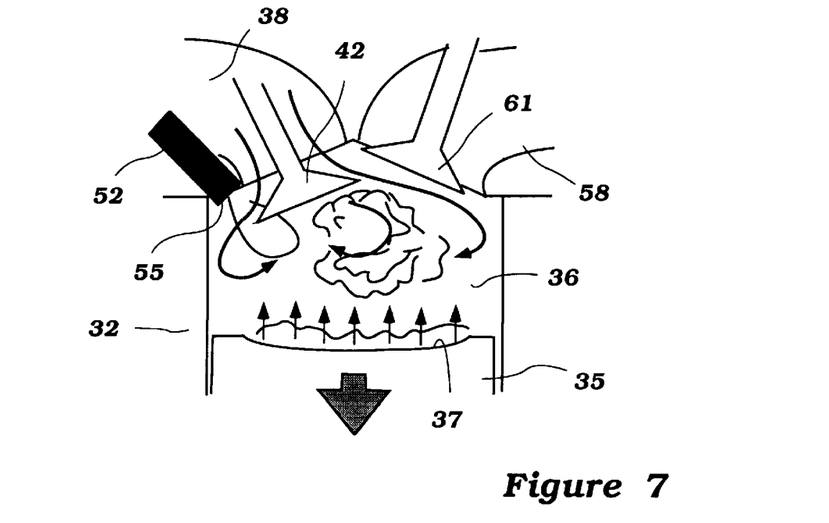
FIG. 7 is a view, in part similar to FIGS. 5 and 6 and shows the condition as the intake stroke continues and immediately prior to the beginning of the compression stroke.

Thus, the condition will be as seen in FIG. 6 when the piston is moving down and the load is such that fuel is still being injected. The fuel will then continue to evaporate and move upwardly toward the exhaust valves 61 so as to be heated by their heat and to improve vaporization.

At this time, the intake valves 42 will be open and there will be some charge directed across the heads of the exhaust valves 61 as seen by the arrows in FIG. 6 so as to sweep the fuel patch across and away from the exhaust valves 61 and then, as the intake stroke continues back toward the center and the area where the spark plug is.

Fuel which has been deposited at the later portion of the injection cycle will begin to evaporate from the ceramic surface 37 of the piston 35 and move upwardly toward the spark gap 57. Any fuel deposited on the head of the piston 35 and specifically from the ceramic surface 37 will continue to vaporize as shown by the arrows in FIG. 7.

As the piston then begins to move upwardly, the compression and squish action will tend to cause the richer fuel/air mixture to converge at the spark plug 57 so that it can be burned even if there is a relatively lean overall mixture in the combustion chamber. Also, because of the long time the fuel has had to remain in the combustion chamber, good vaporization will result.

Figure 9:
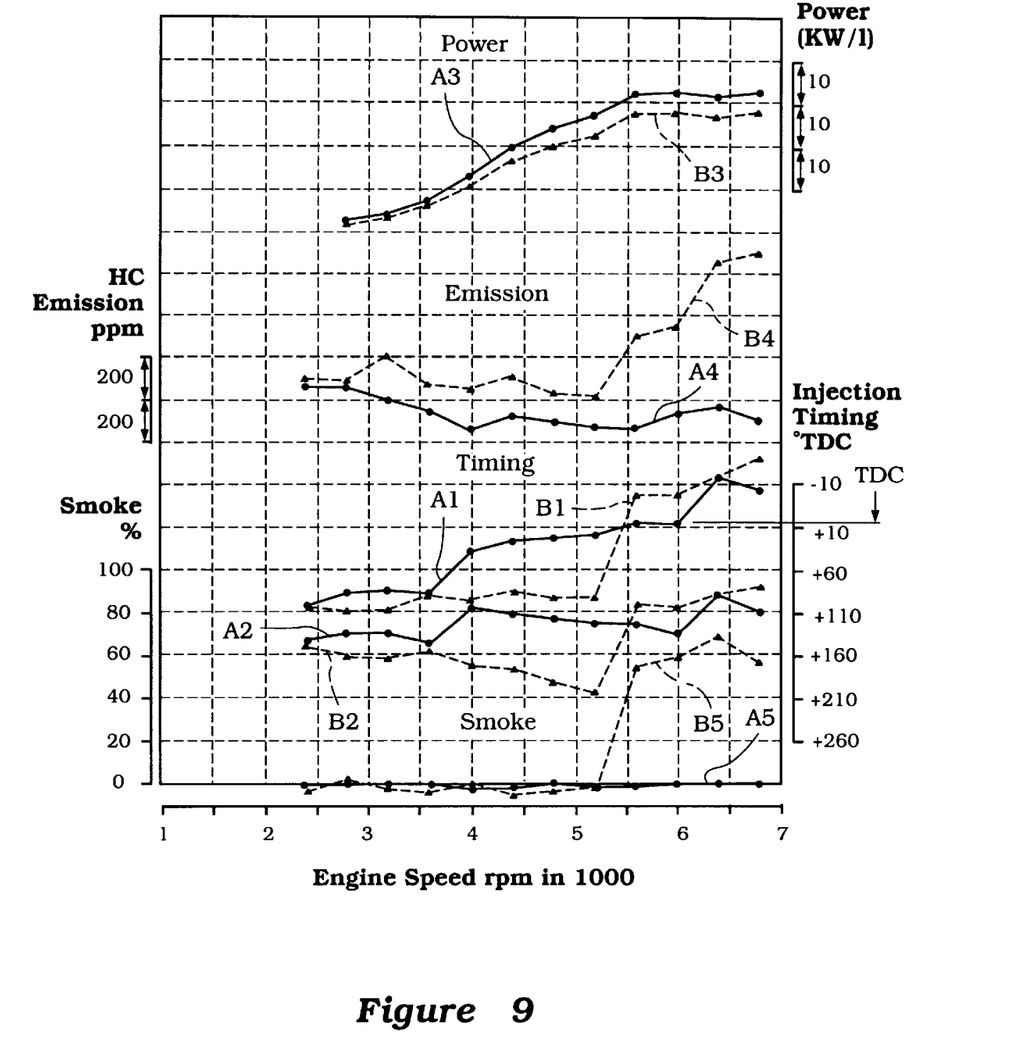
FIG. 9 is a graphical view showing how the invention performs superior to the prior art type of constructions.

The effects of this on engine performance are shown in FIG. 9, wherein the prior art type of constructions are shown by the broken line curves B and those of this invention are shown by the solid line curves A. The top two curves A3 and B3 show the power output of the engine at varying speeds. It should be clear that the output is improved significantly over the prior art type of construction throughout the entire speed and load range.

At the same time, the amount of hydrocarbons present in the exhaust gases (Curves A4 and B4) will be substantially lower in accordance with the invention. Again this is true throughout the entire engine load and speed ranges.

Furthermore, as shown in the bottom-most curves (A5 and B5), the amount of smoke in the exhaust gases will also be substantially lower, particularly under higher engine speeds and higher engine outputs.

The curves A1 and A2 and B1 and B2 show the timing of beginning and ending of fuel injection, respectively, in accordance with this invention and in the prior art. As may be seen, up to the higher engine speeds, fuel injection is begun earlier than the prior art type of arrangements and also terminated earlier except at high mid-range speeds and above. This means that the total amount of fuel injected with the invention can be relatively close to the prior art, but the fuel will be present longer in the combustion chamber to better vaporize. Thus less total fuel is necessary to produce even higher power.

However, as the output becomes higher, then the timing is retarded from conventional engines. With the prior art type of constructions, it is necessary to advance the injection timing at this time to be able to have sufficient fuel in the engine to produce the requisite horsepower. However, in conjunction with this invention, the injection timing can be retarded since the heat of vaporization will still be higher and the fuel will burn more completely even under this running condition. This results in less smoke and better horsepower while further substantially reducing hydrocarbon emissions.

Thus, from the foregoing description it should be readily apparent that the combustion chamber employed and the injection strategy is very effective in providing much better performance over the entire engine speed and load ranges. Of course, the foregoing description is that if a preferred embodiment of the invention and various changes and modifications may be made without departing from the spirit and scope of the invention, as defined by the appended claims.

We claim:

1. An internal combustion engine combustion chamber formed by a cylinder block, cylinder head assembly defining a cylinder bore closed at one end by the cylinder head portion thereof, a piston reciprocating in said cylinder bore for forming a combustion chamber, said piston having a head portion facing a pair of exhaust ports lying on substantially one side of a plane containing the axis of said cylinder bore and a pair of intake ports lying on the other side of said plane, exhaust and intake valves for controlling the opening, respectively, of said exhaust and said intake ports, a fuel injector mounted in said cylinder block, cylinder head assembly at the upper end of one side of said combustion chamber in a position generally between said intake ports, said fuel injector having a spray axis directed generally transversely across said cylinder bore and downwardly toward said head portion of said piston, a spark plug mounted in said cylinder block, cylinder head assembly with its spark gap positioned substantially on said cylinder bore axis and surrounded by said intake and exhaust ports, and a control for controlling the injection of fuel from said injector into said combustion chamber, said injection control being interrelated to the operation of said exhaust valves and said intake valves so that under at least some engine running conditions fuel is injected by said fuel injector into said combustion chamber when said piston is in a position contiguous to its top dead center position and during the exhaust stroke of said engine and when said exhaust valves are at least partially open, said fuel being directed towards piston head and said injection occurring at least in part at a time when said intake valves are open so that the flow from said intake valves will direct fuel away from the heads of said exhaust valves and back toward said piston head for precluding the escape of fuel from said exhaust ports and for effecting the deposit of fuel on said piston head to form a patch of evaporated fuel in the vicinity of said spark plug at the time of firing of said spark plug.

2. An internal combustion engine as set forth in claim 1, wherein the fuel injector has a spray axis that is in the range of 45–70°.

3. An internal combustion engine as set forth in claim 1, wherein the fuel injector is mounted in the cylinder head portion of the cylinder head cylinder block assembly and the spray axis is disposed generally parallel to the flow axes of straight portions of said intake passages formed in said cylinder head portion and which straight portions terminating at curve portions merging into the respective intake ports.

4. An internal combustion engine as set forth in claim 3, wherein the fuel injector has a spray axis that is in the range of 45–70°.

5. An internal combustion engine as set forth in claim 1, wherein the head of the piston is substantially flat.

6. An internal combustion engine as set forth in claim 5, wherein the head of the piston is formed with a ceramic coating in the area intersected by the spray from the fuel injector.

7. An internal combustion engine as set forth in claim 1, wherein the fuel is injected in a continuous spray during the at least some engine running conditions beginning at a time as specified therein.

8. An internal combustion engine as set forth in claim 1, wherein the engine operates on a four stroke cycle.

9. A method of operating an internal combustion engine having a cylinder block cylinder head assembly defining a cylinder bore closed at one end by the cylinder head portion thereof, a piston reciprocating in said cylinder bore for forming a combustion chamber, said piston having a head portion facing a pair of exhaust ports lying on substantially one side of a plane containing the axis of said cylinder bore and a pair of intake ports lying on the other side of said plane, exhaust and intake valves for controlling the opening, respectively, of said exhaust and said intake ports, a fuel injector mounted in said cylinder block, cylinder head assembly at the upper end of one side of said combustion chamber in a position generally between said intake ports, said fuel injector having a spray axis directed generally transversely across said cylinder bore and downwardly toward said head portion of said piston, a spark plug mounted in said cylinder block, cylinder head assembly with its spark gap positioned substantially on said cylinder bore axis and surrounded by said intake and exhaust ports, said method comprising the steps of beginning the injection of fuel from said injector into said combustion chamber under at least some engine running conditions when said piston is in a position contiguous to its top dead center position and during the exhaust stroke of said engine and when said exhaust valves are at least partially open, and continuing said injection at least in part at a time when said intake valves are open so that the flow from said intake valves will direct fuel away from the heads of said exhaust valves and back toward said piston head for precluding the escape of fuel from said exhaust ports and for effecting the deposit of fuel on said piston head to form a patch of evaporated fuel in the vicinity of said spark plug at the time of firing of said spark plug.

10. A method of operating an internal combustion engine as set forth in claim 9, wherein the fuel is sprayed in a cone having an angle in the range of 45–70°.

11. A method of operating an internal combustion engine as set forth in claim 9, wherein the fuel injector is mounted in the cylinder head portion of the cylinder head cylinder block assembly and the spray axis is disposed generally parallel to the flow axes of straight portions of said intake passages formed in said cylinder head portion and which straight portions terminating at curve portions merging into the respective intake ports.

12. A method of operating an internal combustion engine as set forth in claim 11, wherein the fuel is sprayed in a cone having an angle in the range of 45–70°.

13. A method of operating an internal combustion engine as set forth in claim 9, wherein the fuel is injected in a single continuous injection under the at least some engine running conditions beginning at the time as set forth therein.

14. A method of operating an internal combustion engine as set forth in claim 9, wherein the engine is operated on four stroke principal.

* * * * *